US012558925B2

(12) United States Patent
Zeng

(10) Patent No.: US 12,558,925 B2
(45) Date of Patent: Feb. 24, 2026

(54) METHOD AND APPARATUS FOR DISPLAYING FUNCTION MENU INTERFACE OF AUTOMOBILE TYRE PRESSURE MONITORING SYSTEM

(71) Applicant: Autel Intelligent Technology Corp., Ltd., Shenzhen (CN)

(72) Inventor: Feng Zeng, Shenzhen (CN)

(73) Assignee: AUTEL INTELLIGENT TECHNOLOGY CORP., LTD., Shenzhen (CN)

( * ) Notice: Subject to any disclaimer, the term of this patent is extended or adjusted under 35 U.S.C. 154(b) by 260 days.

(21) Appl. No.: 18/032,347

(22) PCT Filed: Oct. 25, 2021

(86) PCT No.: PCT/CN2021/126104
§ 371 (c)(1),
(2) Date: Apr. 18, 2023

(87) PCT Pub. No.: WO2022/089363
PCT Pub. Date: May 5, 2022

(65) Prior Publication Data
US 2023/0391147 A1 Dec. 7, 2023

(30) Foreign Application Priority Data
Oct. 28, 2020 (CN) .......................... 202011176287.5

(51) Int. Cl.
*B60C 23/04* (2006.01)
*B60K 35/10* (2024.01)
(Continued)

(52) U.S. Cl.
CPC .......... *B60C 23/0455* (2013.01); *B60K 35/10* (2024.01); *B60K 35/22* (2024.01);
(Continued)

(58) Field of Classification Search
CPC ........... B60C 23/0479; B60C 23/0455; B60C 23/0471; B60C 23/0408; B60C 23/0433;
(Continued)

(56) References Cited

U.S. PATENT DOCUMENTS

| | | |
|---|---|---|
| 2002/0130771 A1 | 9/2002 | Osborne |
| 2008/0164988 A1 | 7/2008 | DeKeuster |

(Continued)

FOREIGN PATENT DOCUMENTS

| | | |
|---|---|---|
| CN | 201169195 Y | 12/2008 |
| CN | 105774421 A | 7/2016 |

(Continued)

OTHER PUBLICATIONS

The extended European search report of EP application No. 21885090.7 issued on Dec. 5, 2023.

(Continued)

*Primary Examiner* — Hitesh Patel
*Assistant Examiner* — Elle Rose Knudson
(74) *Attorney, Agent, or Firm* — Andrew C. Cheng

(57) ABSTRACT

A method for displaying a function menu interface of an automobile tyre pressure monitoring system includes: determining a candidate radio frequency communication protocol of the tyre pressure monitoring unit according to the vehicle information of an automobile; by means of the radio frequency unit simulating the candidate radio frequency communication protocol, sending a radio frequency signal to the tyre pressure monitoring unit, the radio frequency signal comprising simulation measurement data: if recorded measurement data is read out from the tyre pressure monitoring unit by means of the OBD interface, and the recorded measurement data is the same as the simulation measurement data, then determining that the candidate radio frequency communication protocol is the actual radio fre- (Continued)

quency communication protocol of the tyre pressure monitoring unit; and displaying the function menu interface of the tyre pressure monitoring system according to the actual radio frequency communication protocol.

9 Claims, 3 Drawing Sheets

(51) Int. Cl.
B60K 35/22          (2024.01)
B60K 35/60          (2024.01)
*B60K 35/28*          (2024.01)

(52) U.S. Cl.
CPC .............. B60K 35/60 (2024.01); *B60K 35/28* (2024.01); *B60K 2360/167* (2024.01)

(58) Field of Classification Search
CPC ..... B60C 23/04; B60C 23/0472; B60K 35/28; B60K 35/22; B60K 35/10; B60K 35/00; B60K 2360/589; B60K 2360/583; B60K 35/85; G08C 17/02; B60W 2422/70; B60W 2556/45
See application file for complete search history.

(56) References Cited

U.S. PATENT DOCUMENTS

| | | | |
|---|---|---|---|
| 2012/0259884 A1 | 10/2012 | Donehue | |
| 2015/0015390 A1* | 1/2015 | McIntyre | B60C 23/0472 |
| | | | 340/447 |
| 2018/0194176 A1* | 7/2018 | Bout | B60C 23/0479 |
| 2019/0337340 A1* | 11/2019 | Wu | B60C 23/0472 |
| 2020/0317007 A1 | 10/2020 | Wu | |

FOREIGN PATENT DOCUMENTS

| | | | | | |
|---|---|---|---|---|---|
| CN | 105784272 A | 7/2016 | | | |
| CN | 107878126 A | 4/2018 | | | |
| CN | 108566407 A | 9/2018 | | | |
| CN | 109982872 A | 7/2019 | | | |
| CN | 112248726 A | 1/2021 | | | |
| EP | 3072112 A1 | 9/2016 | | | |
| JP | 2015035215 A | * | 2/2015 | ......... | B60C 23/0415 |
| WO | WO-2019137345 A1 | * | 7/2019 | ......... | B60C 23/0479 |

OTHER PUBLICATIONS

International Search Report of PCT Patent Application No. PCT/CN2021/126104 issued on Dec. 29, 2021.

* cited by examiner

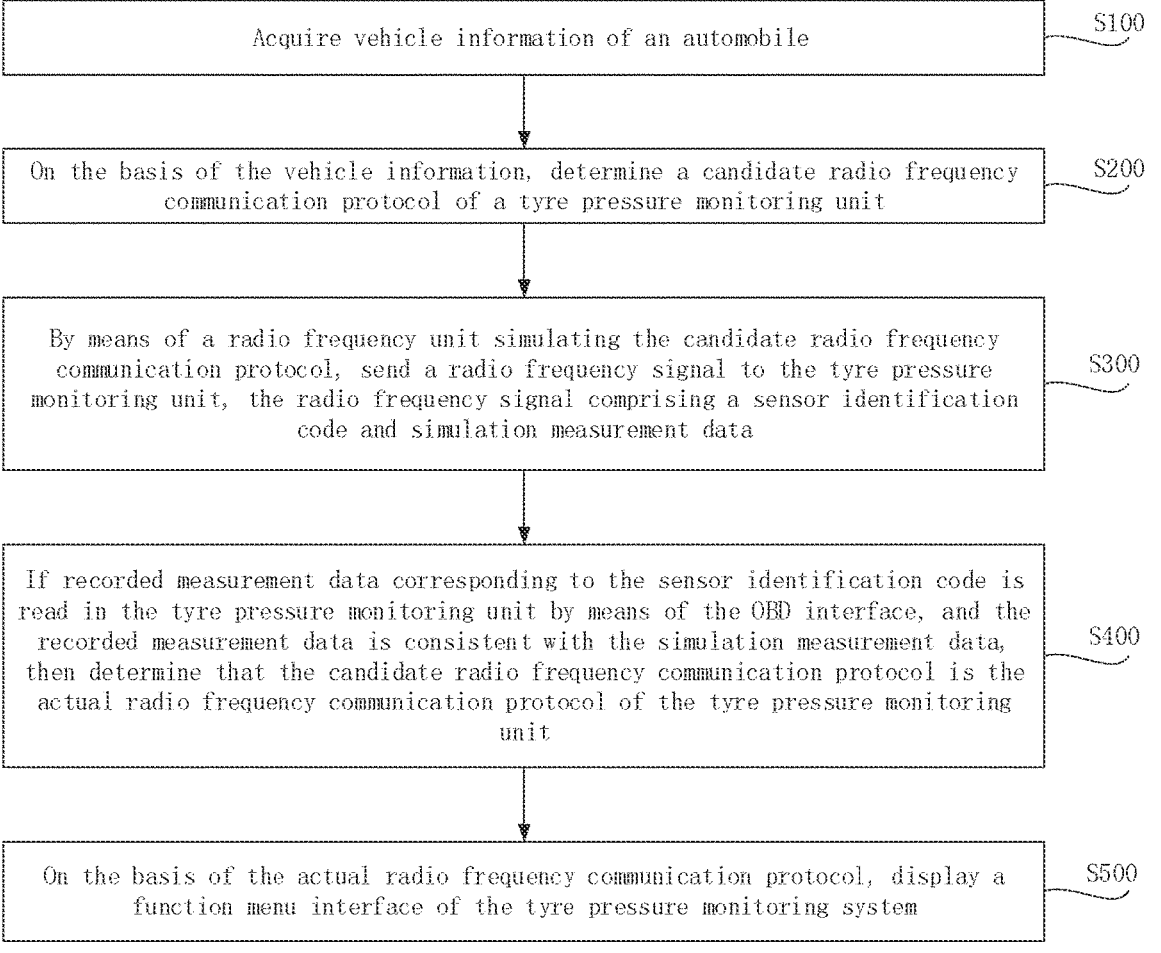

Acquire vehicle information of an automobile — S100

On the basis of the vehicle information, determine a candidate radio frequency communication protocol of a tyre pressure monitoring unit — S200

By means of a radio frequency unit simulating the candidate radio frequency communication protocol, send a radio frequency signal to the tyre pressure monitoring unit, the radio frequency signal comprising a sensor identification code and simulation measurement data — S300

If recorded measurement data corresponding to the sensor identification code is read in the tyre pressure monitoring unit by means of the OBD interface, and the recorded measurement data is consistent with the simulation measurement data, then determine that the candidate radio frequency communication protocol is the actual radio frequency communication protocol of the tyre pressure monitoring unit — S400

On the basis of the actual radio frequency communication protocol, display a function menu interface of the tyre pressure monitoring system — S500

Figure 2

| Synchronization head | Sensor identification code | Pressure data | Temperature data | Acceleration data | Check code |
|---|---|---|---|---|---|
|  |  |  |  |  |  |

Figure 3

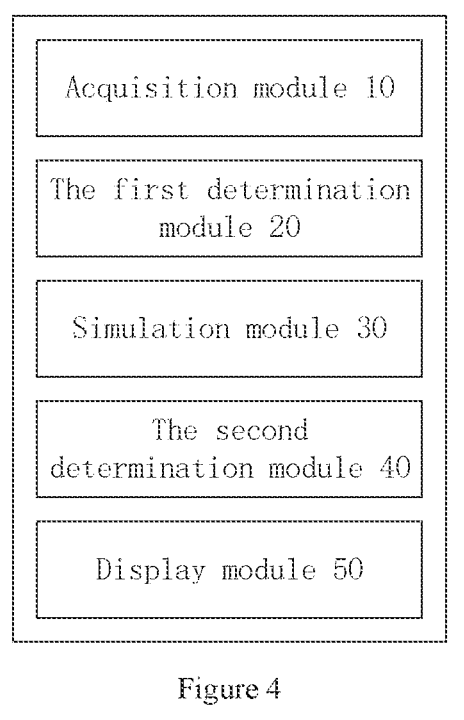

Acquisition module 10

The first determination module 20

Simulation module 30

The second determination module 40

Display module 50

Figure 4

METHOD AND APPARATUS FOR DISPLAYING FUNCTION MENU INTERFACE OF AUTOMOBILE TYRE PRESSURE MONITORING SYSTEM

CROSS-REFERENCE TO RELATED APPLICATIONS

The present application is a U.S. national stage application of International Application Serial No. PCT/CN2021/126104 filed on Oct. 25, 2021, which claims priority to the Chinese Patent Application No. 202011176287.5 filed on Oct. 28, 2020, to the China National Intellectual Property Administration entitled "method and apparatus for displaying function menu interface of automobile tyre pressure monitoring system", the entire contents of which are incorporated herein by reference.

PRIOR ART

The present application relates to the technical field of tyre pressure monitoring, and in particular to a method and apparatus for displaying a function menu interface of an automobile tyre pressure monitoring system.

BACKGROUND OF THE INVENTION

At present, in the process of determining a function menu interface of an automobile tyre pressure monitoring system, a user needs to input detailed vehicle information of the automobile so as to be able to position the function menu interface of the automobile tyre pressure monitoring system. However, in the process of implementing the present invention, the inventors have found that when the vehicle information required to be input by a user is relatively redundant, an error in the input of vehicle information is likely to occur, resulting in an error in the positioning of the function menu interface of an automobile tyre pressure monitoring system, thereby affecting the accuracy of subsequent function operations. Therefore, there is a major potential safety hazard.

SUMMARY OF THE INVENTION

Embodiments of the present invention provide a method and apparatus for displaying a function menu interface of an automobile tyre pressure monitoring system, which can accurately position the function menu interface of the automobile tyre pressure monitoring system.

In order to solve the above technical problem, one technical solution adopted by an embodiment of the present invention is: providing a method for displaying a function menu interface of an automobile tyre pressure monitoring system applied to a tyre pressure monitoring assistance tool, wherein the tyre pressure monitoring assistance tool comprises a radio frequency unit and an OBD interface, the tyre pressure monitoring system comprises a tyre pressure monitoring unit, and the OBD interface is communicatively connected to the tyre pressure monitoring unit. The method comprises:

acquiring vehicle information of an automobile;

on the basis of the vehicle information, determining a candidate radio frequency communication protocol of the tyre pressure monitoring unit;

by means of the radio frequency unit simulating the candidate radio frequency communication protocol, sending a radio frequency signal to the tyre pressure monitoring unit, the radio frequency signal comprising a sensor identification code and simulation measurement data;

if recorded measurement data corresponding to the sensor identification code is read out from the tyre pressure monitoring unit by means of the OBD interface, and the recorded measurement data is consistent with the simulation measurement data, then determining that the candidate radio frequency communication protocol is an actual radio frequency communication protocol of the tyre pressure monitoring unit;

and on the basis of the actual radio frequency communication protocol, displaying a function menu interface of the tyre pressure monitoring system.

Optionally, before a step of determining that the candidate radio frequency communication protocol is an actual radio frequency communication protocol of the tyre pressure monitoring unit, the method further comprises:

determining the candidate radio frequency communication protocol as a pending radio frequency communication protocol;

and repeating at least once simulating the pending radio frequency communication protocol to send a radio frequency signal to the tyre pressure monitoring unit;

wherein if the pending radio frequency communication protocols are all actual radio frequency communication protocols of the tyre pressure monitoring unit, it is determined that the candidate radio frequency communication protocol is the actual radio frequency communication protocol of the tyre pressure monitoring unit.

Optionally, the simulation measurement data comprises at least one of pressure data, temperature data, and acceleration data.

Optionally, before a step of by means of the radio frequency unit simulating the candidate radio frequency communication protocol, sending a radio frequency signal to the tyre pressure monitoring unit, the method further comprises:

determining whether the tyre pressure monitoring unit stores therein the sensor identification code;

and reading the sensor identification code from the tyre pressure monitoring unit through the OBD interface if the sensor identification code is stored in the tyre pressure monitoring unit;

otherwise, prompting a user to write the sensor identification code.

Optionally, the acquiring vehicle information of an automobile specifically comprises:

receiving a user trigger operation, the trigger operation carrying vehicle information;

and determining vehicle information carried by the trigger operation as vehicle information of the automobile.

Optionally, the vehicle information includes vehicle series, vehicle model, and model year.

Optionally, when the candidate radio frequency communication protocol comprises two or more, simulation measurement data of radio frequency signals sent by simulating each of the candidate radio frequency communication protocols is the same.

In order to solve the above technical problem, another technical solution adopted by an embodiment of the present invention is: providing an apparatus for displaying a function menu interface of an automobile tyre pressure monitoring system applied to a tyre pressure monitoring assistance tool, wherein the tyre pressure monitoring assistance tool comprises a radio frequency unit and an OBD interface, the tyre pressure monitoring system comprises a tyre pressure monitoring unit, and the OBD interface is communicatively connected to the tyre pressure monitoring unit. The apparatus comprises:

an acquisition module for acquiring vehicle information of an automobile;

a first determination module for, on the basis of the vehicle information, determining a candidate radio frequency communication protocol of the tyre pressure monitoring unit;

a simulation module for, by means of the radio frequency unit simulating the candidate radio frequency communication protocol, sending a radio frequency signal to the tyre pressure monitoring unit, the radio frequency signal comprising a sensor identification code and simulation measurement data;

a second determination module for, when recorded measurement data corresponding to the sensor identification code is read out from the tyre pressure monitoring unit by means of the OBD interface, and the recorded measurement data is consistent with the simulation measurement data, determining that the candidate radio frequency communication protocol is an actual radio frequency communication protocol of the tyre pressure monitoring unit;

and a display module for, on the basis of the actual radio frequency communication protocol, displaying a function menu interface of the tyre pressure monitoring system.

In order to solve the above technical problem, another technical solution adopted by an embodiment of the present invention is: providing a tyre pressure monitoring assistance tool, comprising:

at least one processor; and a memory, a radio frequency unit, and an OBD interface communicatively connected to at least one processor;

wherein the OBD interface is used for being communicatively connected to a tyre pressure monitoring unit;

the memory stores an instruction executable by at least one processor, and the instruction is executed by at least one processor to enable at least one processor to execute the above-mentioned method.

In order to solve the above technical problem, another technical solution adopted by an embodiment of the present invention is: providing a non-volatile computer readable storage medium storing computer-executable instructions for causing a tyre pressure monitoring assistance tool to execute the above-mentioned method.

A method and apparatus for displaying a function menu interface of an automobile tyre pressure monitoring system provided by an embodiment of the present invention are as follows: after a candidate radio frequency communication protocol of a tyre pressure monitoring unit is determined according to vehicle information of an automobile, a radio frequency signal is sent to the tyre pressure monitoring unit via a radio frequency unit simulating the candidate radio frequency communication protocol, wherein the radio frequency signal comprises a sensor identification code and simulation measurement data; if recorded measurement data corresponding to the sensor identification code is read out from the tyre pressure monitoring unit via an OBD interface, and the recorded measurement data is consistent with the simulation measurement data, then it is determined that the candidate radio frequency communication protocol is the actual radio frequency communication protocol of the tyre pressure monitoring unit, and then the function menu interface of the tyre pressure monitoring system is displayed according to the actual radio frequency communication protocol. Since the radio frequency communication protocol of the tyre pressure monitoring unit in the automobile tyre pressure monitoring system is unique, the function menu interface of the automobile tyre pressure monitoring system can be accurately positioned by determining the actual radio frequency communication protocol of the tyre pressure monitoring unit.

BRIEF DESCRIPTION OF DRAWINGS

One or more embodiments are illustrated exemplarily by the pictures in the corresponding accompanying drawings. These exemplary descriptions do not constitute a limitation on embodiments. Elements with the same reference numerals in the accompanying drawings are represented as similar elements. Unless otherwise stated, the drawings in the accompanying drawings do not constitute a limitation on the scales.

FIG. 2 is a schematic flow diagram of a method for displaying a function menu interface of an automobile tyre pressure monitoring system provided by an embodiment of the present invention;

FIG. 3 is a schematic structural diagram of an RF frame format;

FIG. 4 is a schematic structural diagram of an apparatus for displaying a function menu interface of an automobile tyre pressure monitoring system provided by an embodiment of the present invention.

DETAILED DESCRIPTION OF THE INVENTION

Figure 1:
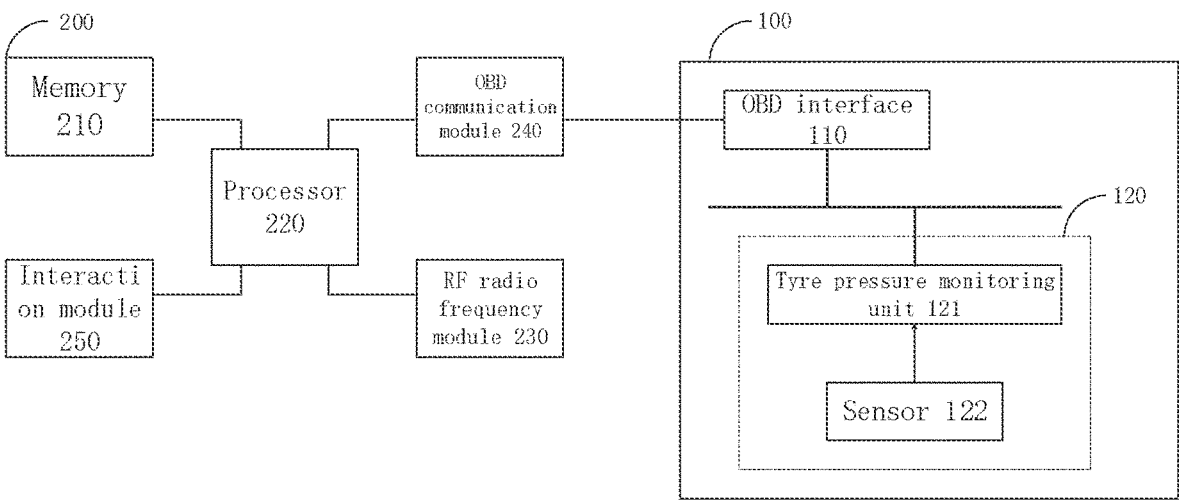
FIG. 1 is a schematic diagram showing a structure of an implementation environment provided by an embodiment of the present invention.

To make the technical solutions of the embodiments of the present invention clearer, the technical solution in the embodiments of the present invention will be clearly and completely described below in conjunction with the accompanying drawings in the embodiments of the present invention. Obviously, the described embodiments are only a part of the embodiments of the present invention, rather than all the embodiments. It should be understood that the specific embodiments described herein are merely illustrative of the present invention and are not intended to be limiting thereof. Based on the embodiments of the present invention, all other examples obtained by one of ordinary skills in the art without involving any inventive efforts are within the scope of the present invention.

It needs to be noted that when one element is referred to as being "connected" to another element, it can be directly connected to another element or one or more intervening elements may be present in between. Further, the technical features involved in the various embodiments of the present invention described below can be combined with each other as long as they do not conflict with each other.

The present invention provides a method and apparatus for displaying a function menu interface of an automobile tyre pressure monitoring system, the method and apparatus being applied to a tyre pressure monitoring assistance tool such that the tyre pressure monitoring assistance tool can accurately position the function menu interface of the automobile tyre pressure monitoring system.

Hereinafter, the present invention will be illustrated by specific embodiments.

Refer to FIG. 1, which is a schematic diagram showing a structure of an implementation environment provided by an embodiment of the present invention. The implementation environment includes: an automobile 100 and a tyre pressure monitoring assistance tool 200. The automobile 100 is provided with a vehicle-mounted OBD interface 110 and a tyre pressure monitoring system 120; the tyre pressure monitoring system 120 includes a tyre pressure monitoring unit 121 and a sensor 122; the vehicle-mounted OBD interface 110 is connected to the tyre pressure monitoring unit 121 via a bus; the tyre pressure monitoring assistance tool 200 is connected to the tyre pressure monitoring unit 121 via the vehicle-mounted OBD interface 110; at this moment, the tyre pressure monitoring assistance tool 200 can read a data stream of the tyre pressure monitoring unit 121 via the vehicle-mounted OBD interface 110; in an embodiment of the present invention, the data stream comprises recorded measurement data.

Specifically, the tyre pressure monitoring unit 121 stores a sensor identification code and a radio frequency communication protocol, and the tyre pressure monitoring unit 121 can identify a radio frequency signal of the corresponding sensor through the sensor identification code and can accurately receive the radio frequency signal of the corresponding sensor through the radio frequency communication protocol. As one of the implementation modes, the sensor identification code stored in the tyre pressure monitoring unit 121 is the sensor identification code of the sensor 122.

It can be understood that, in the process of the tyre pressure monitoring unit 121 receiving the radio frequency signal, only when the radio frequency communication protocol of the tyre pressure monitoring unit 121 is consistent with the radio frequency communication protocol of the corresponding sensor, the tyre pressure monitoring unit 121 can receive the radio frequency signal of the corresponding sensor, and can demodulate and obtain the recorded measurement data consistent with the measurement data carried in the radio frequency signal.

Based on this, an embodiment of the present invention judges whether the radio frequency communication protocol of the tyre pressure monitoring unit 121 is the same as the radio frequency communication protocol simulated by the tyre pressure monitoring assistance tool 200 by determining whether the recorded measurement data consistent with the simulation measurement data carried by the radio frequency signal can be read through the vehicle-mounted OBD interface 110 after the tyre pressure monitoring assistance tool 200 simulates the candidate radio frequency communication protocol of the tyre pressure monitoring unit 121 to send the radio frequency signal to the tyre pressure monitoring unit 121. When the radio frequency communication protocol of the tyre pressure monitoring unit 121 is the same as the radio frequency communication protocol simulated by the tyre pressure monitoring assistance tool 200, the radio frequency communication protocol simulated by the tyre pressure monitoring assistance tool 200 can be determined as the actual radio frequency communication protocol of the tyre pressure monitoring unit 121, and the determination of the radio frequency communication protocol of the tyre pressure monitoring unit can be realized. Since the radio frequency communication protocol of the tyre pressure monitoring unit 121 is unique, after determining the radio frequency communication protocol of the tyre pressure monitoring unit 121, displaying the function menu interface of the tyre pressure monitoring system according to the radio frequency communication protocol of the tyre pressure monitoring unit 121 can improve the accuracy of positioning the function menu interface of the automobile tyre pressure monitoring system.

The radio frequency communication protocols include but are not limited to: 315 Mhz, 433 Mhz, etc.

The tyre pressure monitoring assistance tool 200 comprises: a memory 210, a processor 220, a radio frequency unit 230, an OBD interface 240, and an interaction unit 250. The processor 220 is respectively connected to the memory 210, the radio frequency unit 230, the OBD interface 240, and the interaction unit 250.

The memory 210 serves as a non-volatile computer readable storage medium for storing non-volatile software programs, instructions, and modules.

The memory 210 may include a program storage area and a data storage area. The program storage area can store an operating system and an application program required by at least one function; the data storage area may store data, etc. created according to the use of the tyre pressure monitoring assistance tool, and the data storage area may also store preset data.

In addition, the memory 210 may include high-speed random access memory, and may also include non-volatile memory, such as at least one disk memory device, flash memory device, or other non-volatile solid-state memory devices.

In some embodiments, the memory 210 may optionally include remotely provided memory relative to the processor 220. These remotely provided memories may be connected to a tyre pressure monitoring assistance tool via a network. Such networks include, but are not limited to, the Internet, intranet, local area network, mobile communication network, and combinations thereof.

The processor 220 is a control center of the tyre pressure monitoring assistance tool, and can connect various parts of the whole tyre pressure monitoring assistance tool by using various interfaces and lines. By running or executing non-volatile software programs, instructions, and modules stored in the memory 210, calling the data stored in the memory 210, and executing various functions of the tyre pressure monitoring assistance tool and processing the data, the processor 220 performs overall control on the tyre pressure monitoring assistance tool as a whole, for example, realizing the method for displaying a function menu interface of the automobile tyre pressure monitoring system according to any embodiment of the present invention.

The processor 220 may be one or more, with one processor 220 being exemplified in FIG. 1.

The processor 220 and the memory 210, the radio frequency unit 230, the OBD interface 240, and the interaction unit 250 may be connected by a bus or other means.

The processor 220 may include a central processor (CPU), a digital signal processor (DSP), an application-specific integrated circuit (ASIC), a controller, a field-programmable gate array (FPGA), etc. The processor 220 may also be implemented as a combination of computing equipment, e.g. a combination of a DSP and a microprocessor, multiple microprocessors, one or more microprocessors in conjunction with a DSP core, or any other such configuration.

The radio frequency unit 230 is used for simulating a radio frequency communication protocol to establish a radio frequency connection with the tyre pressure monitoring unit 121 so as to send a radio frequency signal to the tyre pressure monitoring unit 121. In an embodiment of the present invention, the radio frequency unit 230 can simulate a candidate radio frequency communication protocol of the tyre pressure monitoring unit 121 to send a radio frequency signal to the tyre pressure monitoring unit 121, the radio frequency signal being in an RF frame format.

The OBD interface 240 is then used to be electrically connected to the vehicle-mounted OBD interface 110 to establish a communication connection with the tyre pressure monitoring unit 121.

The interaction unit 250 is then used to interact with a user, including outputting display content to the user and/or receiving an input operation from the user.

Specifically, the interaction unit 250 can display information provided to the user, or display information input by the user, or display a menu of the tyre pressure monitoring assistance tool. Further, the user can input the vehicle information of the automobile through the interaction unit 250 so that the tyre pressure monitoring assistance tool 200 acquires the vehicle information of the automobile.

In some embodiments, the tyre pressure monitoring assistance tool 200 further comprises: an LF activation module (not shown) and an RF receiving module (not shown), both of which are connected to the processor 220. The LF activation module is used for waking up a sensor through a low-frequency signal, and the RF receiving module is used for receiving the data sent by the sensor.

It can be understood that when the user connects the OBD interface 240 of the tyre pressure monitoring assistance tool 200 with the vehicle-mounted OBD interface 110 of the automobile and starts the method for displaying a function menu interface of the automobile tyre pressure monitoring system, the tyre pressure monitoring assistance tool 200 reminds the user to input vehicle information of the automobile via the interaction module 250, and receives a trigger operation carrying the vehicle information via the interaction module 250, so as to determine the vehicle information carried by the trigger operation as the vehicle information of the automobile; then, the tyre pressure monitoring assistance tool 200 determines a candidate radio frequency communication protocol of the tyre pressure monitoring unit 121 according to vehicle information of the automobile, and sends a radio frequency signal to the tyre pressure monitoring unit 121 via the radio frequency unit 230 simulating the candidate radio frequency communication protocol, wherein the radio frequency signal comprises a sensor identification code and simulation measurement data; if the tyre pressure monitoring assistance tool 200 reads recorded measurement data corresponding to the sensor identification code in the tyre pressure monitoring unit 121 via the OBD interface 240, and the recorded measurement data is consistent with the simulation measurement data, the candidate radio frequency communication protocol is determined to be an actual radio frequency communication protocol of the tyre pressure monitoring unit 121; the tyre pressure monitoring assistance tool 200 displays the function menu interface of the tyre pressure monitoring system according to the actual radio frequency communication protocol, and outputs the function menu interface of the tyre pressure monitoring system to the interaction unit 250 for display. Since the radio frequency communication protocol of the tyre pressure monitoring unit 121 in the automobile tyre pressure monitoring system is unique, the function menu interface of the automobile tyre pressure monitoring system can be accurately positioned through the actual radio frequency communication protocol of the tyre pressure monitoring unit 121.

Further, refer to FIG. 2, which is a schematic flow diagram of a method for displaying a function menu interface of an automobile tyre pressure monitoring system provided by an embodiment of the present invention. The method for displaying a function menu interface of an automobile tyre pressure monitoring system is applied to the above-mentioned tyre pressure monitoring assistance tool.

As one specific implementation mode, the method for displaying a function menu interface of an automobile tyre pressure monitoring system is executed by the above-mentioned processor 220, and can accurately position the function menu interface of the automobile tyre pressure monitoring system.

Specifically, the method for displaying a function menu interface of an automobile tyre pressure monitoring system comprises:

S100, acquiring vehicle information of an automobile.

In an embodiment of the present invention, the vehicle information of an automobile comprises: vehicle series, vehicle model, and model year.

The vehicle information of an automobile can be obtained either by reading the VIN code of the automobile or by user input.

When the vehicle information of an automobile is obtained through user input, the user-triggered trigger operation carrying the vehicle information is received, and the vehicle information carried by the trigger operation is determined to be the vehicle information of the automobile.

It can be understood that, in the embodiment of the present invention, since the vehicle information of an automobile includes only the vehicle series, the vehicle model, and the model year, the redundancy of user input of the vehicle information is reduced. Therefore, it is possible to avoid the user's input error of the vehicle information during the process of inputting the vehicle information.

S200, on the basis of the vehicle information, determine a candidate radio frequency communication protocol of a tyre pressure monitoring unit.

In an embodiment of the present invention, when on the basis of the vehicle information, determining a candidate radio frequency communication protocol of a tyre pressure monitoring unit is performed, a candidate automobile matching the vehicle information is searched in the automobile database, and the radio frequency communication protocol corresponding to the candidate automobile is determined as the candidate radio frequency communication protocol of the tyre pressure monitoring unit. The automobile database records detailed information of all automobiles leaving the factory.

Since only one radio frequency communication protocol exists in the tyre pressure monitoring unit of each automobile, if the automobile can be uniquely determined according to the vehicle information of the automobile, one candidate radio frequency communication protocol exists; and if the automobile cannot be uniquely determined according to the vehicle information of the automobile, there are at least two candidate radio frequency communication protocols.

When one candidate radio frequency communication protocol exists, the candidate radio frequency communication protocol is directly determined as the actual radio frequency communication protocol of the tyre pressure monitoring unit.

When there are at least two candidate radio frequency communication protocols, steps S300-S400 are executed.

S300, by means of a radio frequency unit simulating the candidate radio frequency communication protocol, send a radio frequency signal to the tyre pressure monitoring unit, the radio frequency signal comprising a sensor identification code and simulation measurement data.

In an embodiment of the invention, the radio frequency unit modulates a sensor identification code and simulation measurement data into an RF frame format via simulating a candidate radio frequency communication protocol to obtain a radio frequency signal, whereby the radio frequency signal comprises the sensor identification code and the simulation measurement data. Based on this, it can be understood that the simulation measurement data is substantially the original data before the modulation. Therefore, when the candidate radio frequency communication protocol comprises two or more, in order to accurately determine the actual radio frequency communication protocol of the tyre pressure monitoring unit, the simulation measurement data of the radio frequency signals sent by the radio frequency unit simulating each candidate radio frequency communication protocol is the same. Of course, in some embodiments, where the simulation measurement data of the radio frequency signals sent by the radio frequency unit simulating each candidate radio frequency communication protocol is different, solutions of embodiments of the present invention can also be implemented.

The radio frequency signal is in an RF frame format. As shown in FIG. 3, the RF frame format comprises a synchronization head, a sensor identification code, simulation measurement data, and a check code, wherein the synchronization head and the check code can be automatically generated during the modulation process of the radio frequency signal.

The sensor identification code is acquired from the tyre pressure monitoring unit so as to ensure that the radio frequency signal sent by the radio frequency unit simulating the candidate radio frequency communication protocol can be identified by the tyre pressure monitoring unit. For this reason, it is necessary to acquire the sensor identification code before the step of sending the radio frequency signal to the tyre pressure monitoring unit through the radio frequency unit simulating the candidate radio frequency communication protocol.

Specifically, when the sensor identification code is acquired, it is determined whether the sensor identification code is stored in the tyre pressure monitoring unit; if the sensor identification code is stored in the tyre pressure monitoring unit, the sensor identification code is read from the tyre pressure monitoring unit via the OBD interface; if the tyre pressure monitoring unit does not store the sensor identification code, the user is prompted to write the sensor identification code, including the user being prompted to write the sensor identification code into the tyre pressure monitoring unit and write the sensor identification code into the tyre pressure monitoring assistance tool.

The simulation measurement data is set by the user, and the simulation measurement data can be set as a random numerical value. In an embodiment of the invention, the simulation measurement data comprises at least one of pressure data, temperature data, and acceleration data. Based on this, when the type of the simulation measurement data is more than one, the numerical values of the simulation measurement data need to be set respectively according to the type of the simulation measurement data. For example, when the simulation measurement data includes pressure data and temperature data, the numerical value of the pressure data and the numerical value of the temperature data need to be set.

Preferably, an embodiment of the present invention selects pressure data as the simulation measurement data.

S400, if recorded measurement data corresponding to the sensor identification code is read out from the tyre pressure monitoring unit by means of the OBD interface, and the recorded measurement data is consistent with the simulation measurement data, then determine that the candidate radio frequency communication protocol is the actual radio frequency communication protocol of the tyre pressure monitoring unit.

In an embodiment of the present invention, the recorded measurement data is data obtained after demodulating the radio frequency signal by the radio frequency communication protocol of the tyre pressure monitoring unit.

Since only when the radio frequency communication protocol of the tyre pressure monitoring unit is the same as the radio frequency communication protocol simulated by the radio frequency unit, the tyre pressure monitoring unit can receive the radio frequency signal and demodulate the radio frequency signal to obtain the recorded measurement data consistent with the simulation measurement data carried in the radio frequency signal, whether the radio frequency communication protocol of the tyre pressure monitoring unit is the same as the radio frequency communication protocol simulated by the radio frequency unit can be judged by determining whether the recorded measurement data consistent with the simulation measurement data can be read through the OBD interface; when the radio frequency communication protocol of the tyre pressure monitoring unit is the same as the radio frequency communication protocol simulated by the radio frequency unit, then the radio frequency communication protocol simulated by the radio frequency unit can be determined as the radio frequency communication protocol of the tyre pressure monitoring unit such that the determination of the radio frequency communication protocol for the tyre pressure monitoring unit can be achieved.

It can be understood that when at least two candidate radio frequency communication protocols comprise a first candidate radio frequency communication protocol and a second candidate radio frequency communication protocol, the tyre pressure monitoring assistance tool sends a first radio frequency signal to the tyre pressure monitoring unit via the radio frequency unit simulating the first candidate radio frequency communication protocol, wherein the first radio frequency signal comprises a sensor identification code and simulation measurement data; at this moment, if the tyre pressure monitoring assistance tool reads recorded measurement data corresponding to the sensor identification code of the first radio frequency signal in the tyre pressure monitoring unit via the OBD interface, and the recorded measurement data is consistent with the simulation measurement data of the first radio frequency signal, then it is determined that the first candidate radio frequency communication protocol is an actual radio frequency communication protocol of the tyre pressure monitoring unit; if the tyre pressure monitoring assistance tool does not read the recorded measurement data corresponding to the sensor identification code of the first radio frequency signal in the tyre pressure monitoring unit via the OBD interface, or if the tyre pressure monitoring assistance tool reads the recorded measurement data corresponding to the sensor identification code of the first radio frequency signal in the tyre pressure monitoring unit via the OBD interface and the recorded measurement data is inconsistent with the simulation measurement data of the first radio frequency signal, the tyre pressure monitoring assistance tool sends a second radio frequency signal to the tyre pressure monitoring unit via the radio frequency unit simulating a second candidate radio frequency communication protocol, wherein the second radio frequency signal comprises the sensor identification code and the simulation measurement data; at this time, if the tyre pressure monitoring assistance tool reads the recorded measurement data corresponding to the sensor identification code of the second radio frequency signal in the tyre pressure monitoring unit through the OBD interface, and the recorded measurement data is consistent with the simulation measurement data of the second radio frequency signal, it is determined that the second candidate radio frequency communication protocol is the actual radio frequency communication protocol of the tyre pressure monitoring unit.

It can be understood that when the candidate radio frequency communication protocol includes two or more, the respective candidate radio frequency communication protocols are different from each other, and one and only one of the candidate radio frequency communication protocols is the actual radio frequency communication protocol of the tyre pressure monitoring unit.

Further, in some embodiments, in order to ensure the accuracy of the result, before the step of determining that the candidate radio frequency communication protocol is the actual radio frequency communication protocol of the tyre pressure monitoring unit, the candidate radio frequency communication protocol is determined to be a pending radio frequency communication protocol, and the step of simulating the pending radio frequency communication protocol to send a radio frequency signal to the tyre pressure monitoring unit is repeated at least once; if during the process that simulating the pending radio frequency communication protocol to send a radio frequency signal to the tyre pressure monitoring unit is repeated at least once, the pending radio frequency communication protocol can be determined to be the actual radio frequency communication protocol of the tyre pressure monitoring unit, then the candidate radio frequency communication protocol is determined to be the actual radio frequency communication protocol of the tyre pressure monitoring unit.

For example, before it is determined that the first candidate radio frequency communication protocol is the actual radio frequency communication protocol of the tyre pressure monitoring unit, the first candidate radio frequency communication protocol is determined to be a pending radio frequency communication protocol; the tyre pressure monitoring assistance tool again simulates the pending candidate radio frequency communication protocol via the radio frequency unit to send a third radio frequency signal to the tyre pressure monitoring unit, wherein the third radio frequency signal comprises sensor identification code and simulation measurement data; at this time, if the tyre pressure monitoring assistance tool reads the recorded measurement data corresponding to the sensor identification code of the third radio frequency signal in the tyre pressure monitoring unit via the OBD interface, and the recorded measurement data is consistent with the simulation measurement data of the third radio frequency signal, then it is determined that the pending candidate radio frequency communication protocol is the actual radio frequency communication protocol of the tyre pressure monitoring unit; then, the tyre pressure monitoring assistance tool again simulates the pending candidate radio frequency communication protocol to send a fourth radio frequency signal to the tyre pressure monitoring unit via the radio frequency unit, wherein the fourth radio frequency signal comprises sensor identification code and simulation measurement data; at this time, if the tyre pressure monitoring assistance tool reads the recorded measurement data corresponding to the sensor identification code of the fourth radio frequency signal in the tyre pressure monitoring unit via the OBD interface, and recorded measurement data is consistent with the simulation measurement data of the fourth radio frequency signal, then it is determined that the pending candidate radio frequency communication protocol is the actual radio frequency communication protocol of the tyre pressure monitoring unit; since it is possible to determine that the pending radio frequency communication protocol is the actual radio frequency communication protocol of the tyre pressure monitoring unit after simulating the pending radio frequency communication protocol to send the radio frequency signal to the tyre pressure monitoring unit is repeated twice, the first candidate radio frequency communication protocol is determined to be the actual radio frequency communication protocol of the tyre pressure monitoring unit.

The numerical value of the simulation measurement data of the first radio frequency signal, the numerical value of the simulation measurement data of the third radio frequency signal, and the numerical value of the simulation measurement data of the fourth radio frequency signal may be the same or different.

S500, on the basis of the actual radio frequency communication protocol, display a function menu interface of the tyre pressure monitoring system.

Specifically, when on the basis of the actual radio frequency communication protocol, displaying a function menu interface of the tyre pressure monitoring system is performed, after positioning an automobile according to the actual radio frequency communication protocol, the function menu interface of the automobile tyre pressure monitoring system is started according to the menu of the automobile, and the function menu interface is sent to the interaction unit for display. Since the radio frequency communication protocol of the tyre pressure monitoring unit in the automobile tyre pressure monitoring system is unique, the automobile tyre pressure monitoring system can be uniquely determined according to the actual radio frequency communication protocol of the tyre pressure monitoring unit, and then the function menu interface of the automobile tyre pressure monitoring system can be accurately positioned.

The function menu interface of the tyre pressure monitoring system is used for displaying menu information of the tyre pressure monitoring system. Specifically, the function menu interface can be used for displaying an icon corresponding to each functional module for a user to select a corresponding implementation function according to the icon so as to realize a functional operation with the tyre pressure detection system. The functional module displayed by the function menu interface comprises functions such as sensor activation, sensor programming, and sensor part number query. The operations such as the maintenance of the tyre pressure detection system can be completed via a functional module provided by the function menu interface.

It can be understood that in an embodiment of the present invention, whether the radio frequency communication protocol of the tyre pressure monitoring unit is the same as the radio frequency communication protocol simulated by the radio frequency unit is judged by determining whether the recorded measurement data consistent with the simulation measurement data can be read via the OBD interface; when the radio frequency communication protocol of the tyre pressure monitoring unit is the same as the radio frequency communication protocol simulated by the radio frequency unit, the radio frequency communication protocol simulated by the radio frequency unit can be determined as the radio frequency communication protocol of the tyre pressure monitoring unit, and the radio frequency communication protocol of the tyre pressure monitoring unit can be accurately determined, and further, the function menu interface of the tyre pressure monitoring system can be accurately positioned according to the radio frequency communication protocol of the tyre pressure monitoring unit, so as to improve the accuracy of positioning the function menu interface of the automobile tyre pressure monitoring system.

Further, refer to FIG. 4, which is a schematic structural diagram of an apparatus for displaying a function menu interface of an automobile tyre pressure monitoring system provided by an embodiment of the present invention. The apparatus for displaying a function menu interface of an automobile tyre pressure monitoring system can be applied to the above-mentioned tyre pressure monitoring assistance tool. As one specific implementation mode, functions of each module of the apparatus for displaying a function menu interface of an automobile tyre pressure monitoring system are executed by the above-mentioned processor 220, and can accurately position the function menu interface of the automobile tyre pressure monitoring system.

The term "module" used below is a combination of software and/or hardware that can implement a predetermined function. Although the apparatus described in the following embodiments may be implemented in software, implementations in hardware, or a combination of software and hardware, may also be conceived.

Specifically, the apparatus for displaying a function menu interface of an automobile tyre pressure monitoring system comprises:

an acquisition module 10 for acquiring vehicle information of an automobile;

a first determination module 20 for, on the basis of the vehicle information, determining a candidate radio frequency communication protocol of a tyre pressure monitoring unit;

a simulation module 30 for, by means of a radio frequency unit simulating the candidate radio frequency communication protocol, sending a radio frequency signal to the tyre pressure monitoring unit, the radio frequency signal comprising a sensor identification code and simulation measurement data;

a second determination module 40 for, when recorded measurement data corresponding to the sensor identification code is read out from the tyre pressure monitoring unit by means of the OBD interface, and the recorded measurement data is consistent with the simulation measurement data, determining that the candidate radio frequency communication protocol is the actual radio frequency communication protocol of the tyre pressure monitoring unit;

and a display module 50 for, on the basis of the actual radio frequency communication protocol, displaying a function menu interface of the tyre pressure monitoring system.

In some embodiments, the second determination module 40 is further used for:

determining the candidate radio frequency communication protocol as a pending radio frequency communication protocol before determining the candidate radio frequency communication protocol as an actual radio frequency communication protocol of the tyre pressure monitoring unit;

and repeating at least once simulating the pending radio frequency communication protocol to send a radio frequency signal to the tyre pressure monitoring unit;

wherein if the pending radio frequency communication protocols are all actual radio frequency communication protocols of the tyre pressure monitoring unit, it is determined that the candidate radio frequency communication protocol is the actual radio frequency communication protocol of the tyre pressure monitoring unit.

In some embodiments, the simulation measurement data comprises at least one of pressure data, temperature data, and acceleration data.

In some embodiments, the first determination module 20 is further used for:

determining whether the sensor identification code is stored in the tyre pressure monitoring unit before sending a radio frequency signal to the tyre pressure monitoring unit by the radio frequency unit simulating the candidate radio frequency communication protocol;

and reading the sensor identification code from the tyre pressure monitoring unit through the OBD interface if the sensor identification code is stored in the tyre pressure monitoring unit;

otherwise, prompting a user to write the sensor identification code.

In some embodiments, the acquisition module 10 is specifically used for:

receiving a user trigger operation, the trigger operation carrying vehicle information;

and determining vehicle information carried by the trigger operation as vehicle information of the automobile.

In some embodiments, the vehicle information includes vehicle series, vehicle model, and model year.

In some embodiments, when the candidate radio frequency communication protocols include two or more, the simulation measurement data of radio frequency signals sent by simulating each of the candidate radio frequency communication protocols is the same.

Since the apparatus embodiment and the method embodiment are based on the same concept, the contents of the apparatus embodiment can refer to the method embodiment without the contents conflicting with each other, and the description thereof will not be repeated.

It can be understood that in an embodiment of the present invention, whether the radio frequency communication protocol of the tyre pressure monitoring unit is the same as the radio frequency communication protocol simulated by the radio frequency unit is judged by determining whether the recorded measurement data consistent with the simulation measurement data can be read via the OBD interface; when the radio frequency communication protocol of the tyre pressure monitoring unit is the same as the radio frequency communication protocol simulated by the radio frequency unit, the radio frequency communication protocol simulated by the radio frequency unit can be determined as the radio frequency communication protocol of the tyre pressure monitoring unit, and the radio frequency communication protocol of the tyre pressure monitoring unit can be accurately determined, and further, the function menu interface of the tyre pressure monitoring system can be accurately positioned according to the radio frequency communication protocol of the tyre pressure monitoring unit, so as to improve the accuracy of positioning the function menu interface of the automobile tyre pressure monitoring system.

An embodiment of the present invention also provides a non-volatile computer readable storage medium having stored thereon computer-executable instructions that, when executed by one or more processors, such as one processor 220 in FIG. 1, may cause the computer to execute various steps of a method for displaying a function menu interface of an automobile tyre pressure monitoring system in any of the method embodiments described above, or to implement the functions of each module of an apparatus for displaying a function menu interface of an automobile tyre pressure monitoring system in any of the apparatus embodiments described above.

An embodiment of the present invention also provides a computer program product comprising a computer program stored on a non-volatile computer readable storage medium, the computer program comprising program instructions which, when executed by one or more processors, such as one processor 220 in FIG. 1, may cause the computer to execute various steps of a method for displaying a function menu interface of an automotive tyre pressure monitoring system in any of the method embodiments described above, or to implement the functions of each module of an apparatus for displaying a function menu interface of an automobile tyre pressure monitoring system in any of the apparatus embodiments described above.

The apparatus embodiments described above are merely illustrative, wherein the modules illustrated as separate components may or may not be physically separated, and the components shown as modules may or may not be physical units, i.e. may be located in one place, or may also be distributed over multiple network units. Some or all of the modules may be selected to achieve the object of the embodiment solution according to actual needs.

From the above description of the embodiments, those skilled in the art can clearly understand that each embodiment can be realized by means of software plus a general hardware platform, and of course, by means of hardware. It could be understood by those of ordinary skills in the art that implementing all or part of the flow of the methods of the embodiments described above can be accomplished by a computer program instruction associated hardware. The program can be stored on a computer readable storage medium, and when executed, can include the flow of the implementation method of the methods described above. The storage medium may be a magnetic disk, an optical disk, a Read-Only Memory (ROM) or a Random Access Memory (RAM), etc.

The above-mentioned description is merely an embodiment of the present invention, and does not limit the scope of the present invention. Any equivalent structure or equivalent process change made by using the contents of the description and the drawings of the present invention or directly or indirectly used in other relevant technical fields is likewise included in the scope of protection of the present invention.

Finally, it should be noted that the above embodiments are merely illustrative of the technical solutions of the present invention, rather than limiting it; combinations of technical features in the above embodiments or in different embodiments are also possible under the concept of the invention, the steps can be implemented in any order, and there are many other variations of different aspects of the invention described above, which are not provided in detail for the sake of brevity; although the present invention has been described in detail with reference to the foregoing embodiments, those skilled in the art should appreciate that the technical solutions disclosed in the above-mentioned embodiments can still be amended, or some of the technical features can be replaced by equivalents; such modifications or substitutions do not make the essence of the corresponding technical solution depart from the scope of the technical solutions of the embodiments of the application.

The invention claimed is:

1. A method for displaying a function menu interface of an automobile tyre pressure monitoring system applied to a tyre pressure monitoring assistance tool, wherein the tyre pressure monitoring assistance tool comprises a processor, a radio frequency unit and an OBD interface, the tyre pressure monitoring system comprises a tyre pressure monitoring unit, and the OBD interface is communicatively connected to the tyre pressure monitoring unit, wherein the method comprises:

acquiring, by the processor, vehicle information of an automobile;

on the basis of the vehicle information, determining, by the processor, at least two candidate radio frequency communication protocols of the tyre pressure monitoring unit;

sending a radio frequency signal to the tyre pressure monitoring unit, the radio frequency signal comprising a sensor identification code and simulation measurement data, by means of the radio frequency unit simulating a first candidate radio frequency communication protocol of the at least two candidate radio frequency communication protocols;

if recorded measurement data corresponding to the sensor identification code is read out from the tyre pressure monitoring unit by means of the OBD interface, the recorded measurement data being the same as the simulation measurement data, determining, by the processor, that the first candidate radio frequency communication protocol is an actual radio frequency communication protocol of the tyre pressure monitoring unit; and displaying, on the basis of the actual radio frequency communication protocol, the function menu interface of the tyre pressure monitoring system.

2. The method according to claim 1, wherein before a step of determining that the first candidate radio frequency communication protocol is the actual radio frequency communication protocol of the tyre pressure monitoring unit, the method further comprises:

determining the first candidate radio frequency communication protocol as a pending radio frequency communication protocol; and repeating at least once simulating the pending radio frequency communication protocol to send the radio frequency signal to the tyre pressure monitoring unit;

if the pending radio frequency communication protocols are actual radio frequency communication protocols of the tyre pressure monitoring unit, determining that the first candidate radio frequency communication protocol is the actual radio frequency communication protocol of the tyre pressure monitoring unit.

3. The method according to claim 2, wherein the simulation measurement data comprises at least one of pressure data, temperature data, and acceleration data.

4. The method according to claim 1, wherein before a step of sending a radio frequency signal to the tyre pressure monitoring unit, by means of the radio frequency unit simulating the first candidate radio frequency communication protocol, the method further comprises:

determining whether the tyre pressure monitoring unit stores the sensor identification code; and reading the sensor identification code from the tyre pressure monitoring unit through the OBD interface if the sensor identification code is stored in the tyre pressure monitoring unit;

prompting a user to write the sensor identification code if the sensor identification code is not stored in the tyre pressure monitoring unit.

5. The method according to claim 1, wherein the acquiring vehicle information of an automobile specifically comprises:

receiving a user trigger operation, the user trigger operation carrying vehicle information; and determining vehicle information carried by the trigger operation as vehicle information of the automobile.

6. The method according to claim 5, wherein the vehicle information comprises vehicle series, vehicle model, and model year.

7. The method according to claim 1, wherein when there are two or more candidate radio frequency communication protocols, simulation measurement data of radio frequency signals sent by simulating each of the candidate radio frequency communication protocols is the same.

8. A tyre pressure monitoring assistance tool, comprising:

at least one processor; and a memory, a radio frequency unit, and an OBD interface communicatively connected to the at least one processor;

wherein the OBD interface is communicatively connected to a tyre pressure monitoring unit;

the memory stores an instruction executable by the at least one processor, and the instruction is executed by the at least one processor to enable the at least one processor to execute the method comprising:

acquiring vehicle information of an automobile;

on the basis of the vehicle information, determining at least two candidate radio frequency communication protocols of the tyre pressure monitoring unit:

sending a radio frequency signal to the tyre pressure monitoring unit, the radio frequency signal comprising a sensor identification code and simulation measurement data, by means of the radio frequency unit simulating a first candidate radio frequency communication protocol of the at least two candidate radio frequency communication protocols:

if recorded measurement data corresponding to the sensor identification code is read out from the tyre pressure monitoring unit by means of the OBD interface, the recorded measurement data being the same as the simulation measurement data, determining that the first candidate radio frequency communication protocol is an actual radio frequency communication protocol of the tyre pressure monitoring unit; and displaying, on the basis of the actual radio frequency communication protocol, the function menu interface of the tyre pressure monitoring system.

9. A non-volatile computer readable storage medium, wherein the non-volatile computer readable storage medium stores a computer-executable instruction for causing a tyre pressure monitoring assistance tool to execute the method comprising:

acquiring vehicle information of an automobile;

on the basis of the vehicle information, determining at least two candidate radio frequency communication protocols of the tyre pressure monitoring unit;

sending a radio frequency signal to the tyre pressure monitoring unit, the radio frequency signal comprising a sensor identification code and simulation measurement data, by means of the radio frequency unit simulating a first candidate radio frequency communication protocol of the at least two candidate radio frequency communication protocols;

if recorded measurement data corresponding to the sensor identification code is read out from the tyre pressure monitoring unit by means of the OBD interface, the recorded measurement data being the same as the simulation measurement data, determining that the first candidate radio frequency communication protocol is an actual radio frequency communication protocol of the tyre pressure monitoring unit: and displaying, on the basis of the actual radio frequency communication protocol, the function menu interface of the tyre pressure monitoring system.

\* \* \* \* \*